United States Patent

Slemmer et al.

(10) Patent No.: US 6,377,990 B1
(45) Date of Patent: Apr. 23, 2002

(54) SYSTEM FOR PROVIDING INTERNET ACCESS FROM LOCATIONS DIFFERENT FROM THOSE FOR WHICH THE USER'S SOFTWARE WAS CONFIGURED

(75) Inventors: Michael W. Slemmer; Roger D. McAulay, both of San Francisco, CA (US)

(73) Assignee: LodgeNet Entertainment Corporation, Sioux Falls, SD (US)

(*) Notice: Subject to any disclaimer, the term of this patent is extended or adjusted under 35 U.S.C. 154(b) by 0 days.

(21) Appl. No.: 09/097,603

(22) Filed: Jun. 15, 1998

(51) Int. Cl.[7] .............................................. G06F 15/173
(52) U.S. Cl. ....................... 709/225; 709/242; 709/220; 370/392
(58) Field of Search ................................. 709/245, 246, 709/242, 225, 220, 228; 370/392, 395

(56) References Cited

U.S. PATENT DOCUMENTS

| | | | | |
|---|---|---|---|---|
| 5,557,748 A | * | 9/1996 | Norris .......................... | 709/220 |
| 5,617,540 A | | 4/1997 | Civantar et al. ....... | 395/200.11 |
| 5,745,699 A | * | 4/1998 | Lunn et al. .................. | 709/245 |
| 5,751,971 A | | 5/1998 | Dobbins et al. ....... | 395/200.68 |
| 5,758,083 A | | 5/1998 | Singh et al. ........... | 395/200.53 |
| 5,790,548 A | | 8/1998 | Sistanizadeh et al. ....... | 370/401 |
| 5,793,763 A | | 8/1998 | Mayes et al. ............... | 370/389 |
| 5,812,819 A | | 9/1998 | Rodwin et al. ............. | 395/500 |
| 5,818,845 A | | 10/1998 | Moura et al. ............... | 370/449 |
| 5,835,720 A | | 11/1998 | Nelson et al. .......... | 395/200.54 |
| 5,835,725 A | * | 11/1998 | Chiang et al. .............. | 709/228 |
| 5,854,901 A | * | 12/1998 | Cole et al. .................. | 709/245 |
| 5,909,441 A | * | 6/1999 | Alexander, Jr. et al. .... | 370/395 |
| 5,918,016 A | * | 6/1999 | Brewer et al. .............. | 709/242 |
| 5,946,308 A | * | 8/1999 | Dobbins et al. ............ | 370/392 |
| 5,958,018 A | * | 9/1999 | Eng et al. ................... | 709/246 |
| 6,006,272 A | * | 12/1999 | Aravamudan et al. ...... | 709/245 |
| 6,070,187 A | * | 5/2000 | Subramaniam et al. ..... | 709/220 |
| 6,130,892 A | | 10/2000 | Short et al. ................. | 370/401 |
| 6,141,686 A | * | 10/2000 | Jackowski et al. .......... | 709/224 |
| 6,148,336 A | * | 11/2000 | Thomas et al. ............. | 709/224 |
| 6,266,335 B1 | * | 7/2001 | Bhaskaran .................. | 370/399 |

OTHER PUBLICATIONS

Kim et al, Global Address Resolution Scheme for IP and ARP over ATM.*

* cited by examiner

*Primary Examiner*—Mark H. Rinehart
*Assistant Examiner*—Thong Vu
(74) *Attorney, Agent, or Firm*—Sheridan Ross P.C.

(57) ABSTRACT

A method for operating a local area network having a server and a plurality of computers. The server includes an Internet gateway for directing messages to and from the Internet. Each computer in the network has a unique IP address and a unique network adapter address associated with that computer. Each computer determines the network adapter address associated with a target IP address by broadcasting an address resolution protocol (ARP) message on the local area network. The server stores information identifying IP addresses in a foreign class corresponding to computers not configured for connection to the local area network. The server responds to each ARP having a target IP address in the foreign class by returning the network adapter address of the server in the response message and assigning an IP address associated with the local area network to the IP address of the computer sending the ARP. The server translates each outbound message originating on the local area network for a destination address in the foreign class by replacing the originating IP address in the message with the IP address assigned on the local area network. The translated message is then sent via the gateway. The sever also examines each inbound message received on the gateway for a destination IP address associated with the local area network to determine if the destination address is an IP address that has been assigned to an IP address in said foreign class. If such an assignment has been made, the server translates the destination IP address.

24 Claims, 1 Drawing Sheet

SYSTEM FOR PROVIDING INTERNET ACCESS FROM LOCATIONS DIFFERENT FROM THOSE FOR WHICH THE USER'S SOFTWARE WAS CONFIGURED

FIELD OF THE INVENTION

The present invention relates to computer networks, and more particularly, to a computer server that provides Internet access to computers configured for a different server without requiring reprogramming of the computers.

BACKGROUND OF THE INVENTION

The present invention may be more easily understood with reference to a mobile computer user who utilizes a portable computer that is configured for the computer network at the user's headquarters. When the user is connected to the headquarters' network, the user has high speed access to the resources of that network which typically include file servers, internet access, and E-Mail. When the user unplugs her computer from this network and travels to a hotel, this high-speed access is typically lost.

The most common form of remote access is via a modem over a conventional phone line. Since the bandwidth of a conventional phone line is much lower than that of a typical office network, the time needed to complete any significant data transfer from the headquarters' network can be substantial.

To make matters worse, most hotels utilize phone systems that are poorly adapted to high-speed digital transmissions. The phone systems were designed to accommodate voice transmissions having a relatively short duration compared to the duration of the average network connection. Hence, if a large number of hotel guests are making modem calls to connect to their corporate networks, the hotel phone system runs out of capacity to service the traffic. In addition, many digital PBX systems utilize signal levels that are incompatible with conventional computer modems, thus making even this type of low bandwidth connection impossible.

Accordingly, systems for providing high-speed network access within a hotel or similar facility have been suggested to cure these problems. Ideally, the mobile user would plug her computer into an Ethernet network at the hotel, which includes a server connected to the Internet. The user could then enjoy the same high-speed access that was available at her corporate headquarters. Furthermore, such a system would by-pass the telephone system within the hotel, thereby avoiding the capacity problems described above.

Unfortunately, the software that oversees the network connection typically includes addresses that are particular to the network. For networks connected to the Internet, each computer on the network is assigned an address of the form A.B.C.D where A, B, C, and D are 8-bit integers. One of these addresses corresponds to the network server that connects the local office network to the Internet. A computer wishing to communicate with another computer on the network, including the server, directs a message to that computer using its address. The server is programmed to recognize the addresses that are particular to the local area network. When the server sees a message for an address that is not part of the local area network, the server forwards the message to the Internet. Similarly, when the server detects an incoming message from the Internet with a destination address for one of the computers on the local area network, the server transfers that message to the local area network and the appropriate computer accepts the message.

Since the addresses on each local area network are unique, when a computer is moved from one local area network to another, the computer's address will not be recognized by the server in the new network as being part of that server's local area network. Furthermore, a message from the mobile computer to the server address it associates with the Internet will not be recognized by the current server as a request for sending a message to an address on the Internet. Hence, a new address must be assigned to the business traveler's computer when she connects it to the hotel's local area network.

One solution to providing the new address requires the user to enter an address provided by the hotel server when the traveler first logs onto the network. However, this solution to the problem requires two reconfigurations of the traveler's computer, once when she logs onto the hotel network and once when she returns to her office network. Such reconfigurations require expertise that is outside the computer skills of the typical business traveler. In addition, the business traveler must keep a copy of her old network address so that she can reconfigure her computer on return to her own network. Another solution is to allow the traveler's computer to dynamically receive an address from the server using a protocol such as DHCP or BOOTP. However, since many corporate networks do not use such protocols, travelers will still need to reconfigure their computers to enable DHCP or BOOTP. Such reconfigurations also result in business traveler losing track of her old network address.

A second problem with hotel local area networks arises from security concerns. A local area network that connects all of the guest rooms allows any guest to "see" the contents of the computers of another guest if the other guest's computer has been programmed to allow file sharing. Such sharing may have been setup for use in the headquarters' local area network environment. However, it clearly can pose security problems in the hotel setting. Since the business traveler's computer may have been programmed by her company technicians, she may not know that such a security problem exists, no less have the technical expertise to turn off the file sharing option.

Broadly, it is the object of the present invention to provide an improved local area network for use in hotel-like environments.

It is a further object of the present invention to provide a local area network that does not require the user to reconfigure her computer address when she logs onto the network.

It is a still further object of the present invention to provide a local area network that protects individual computers from access by other computers on the network without requiring reconfiguration of the file sharing options on the computer.

These and other objects of the present invention will become apparent to those skilled in the art from the following detailed description of the invention and the accompanying drawings.

SUMMARY OF THE INVENTION

The present invention is a method for operating a local area network having a server and a plurality of computers. The server includes an Internet gateway for directing messages to and from the Internet. Each computer in the network has a unique IP address and a unique network adapter address associated with that computer. Each computer determines the network adapter address associated with a target IP address by broadcasting an address resolution protocol (ARP) message on the local area network. The ARP includes the target IP address and the network adapter address and IP address of the computer broadcasting the ARP. The computer having the target IP address responds to an ARP by sending a response message that includes the network adapter address of the computer having the target IP address. In the present invention, the server stores information identifying IP addresses in a foreign class corresponding to computers not configured for connection to the local area network. The server responds to each ARP having a target IP address in the foreign class by returning the network adapter address of the server in the response message and assigning an IP address associated with the local area network to the IP address of the computer sending the ARP. The server translates each outbound message originating on the local area network for a destination address in the foreign class from an originating address for which one of the IP addresses associated with the local area network has been assigned. The translation consists of replacing the IP address of the computer originating the message with the corresponding IP address assigned to that computer. The translated message is then sent via the gateway. The sever also examines each inbound message received on the gateway for a destination IP address associated with the local area network to determine if the destination address is an IP address that has been assigned to an IP address in said foreign class. If such an assignment has been made, the server replaces the destination IP address in the message with the foreign IP address and sends the inbound message on the local area network.

DETAILED DESCRIPTION OF THE INVENTION

Figure 1:
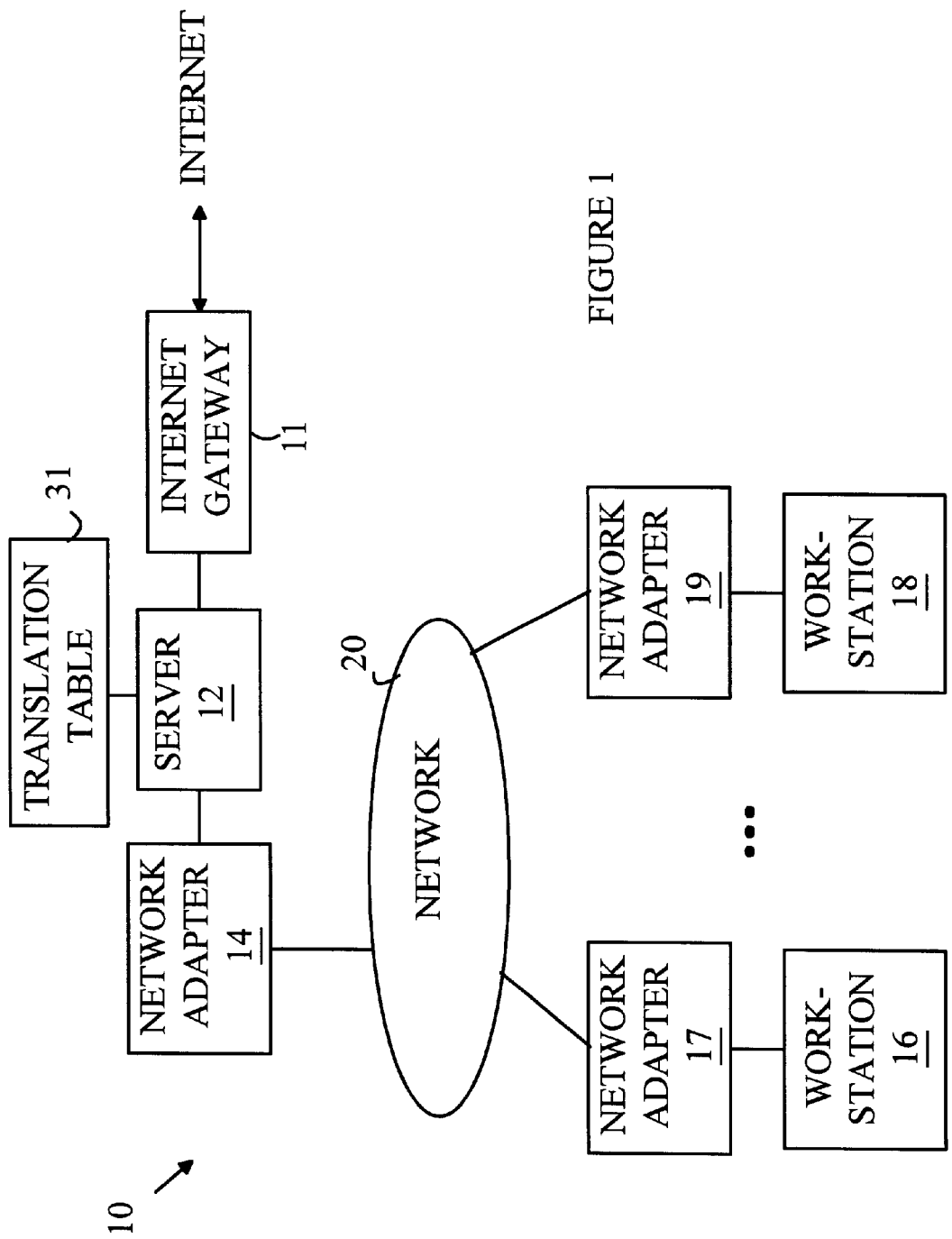
FIG. 1 is a block diagram of a local area network according to the present invention.

The manner in which the present invention achieves its advantages may be more readily understood with reference to FIG. 1 which is a block diagram of a typical local area network 10 that is connected to the internet via a server 12 according to the present invention. Server 12 provides file access and Internet services for the various work-stations connected to network 20. Typical work-stations are shown at 16 and 18.

Communications on the network take place under a layered protocol with one layer governing communications between hardware network adapters that connect the various computers to network 20. The network adapters corresponding to computers 12, 16, and 18 are shown at 14, 17, and 19, respectively. For the purposes of the present discussion, it will be assumed that the network adapters and wiring implement an Ethernet network. Each network adapter has a unique 6-byte identification code that distinguishes it from every other adapter constructed to the relevant standard.

Consider the case in which work-station 16 wishes to send a packet to server 12. The packet is encapsulated in an Ethernet message, which includes the network adapter identification codes of network adapters 14 and 17. This Ethernet message is then placed on network 20 by network adapter 17. Network adapter 14 and the relevant drivers recognize the message as being directed to adapter 14 and unpack the packet. The unpacked message is then passed to the next level which is handled by the server software.

The second level of the protocol corresponds to the computers on the network. Each computer has one or more unique Internet addresses of the form A.B.C.D. Such addresses will be referred to as "IP addresses" in the following discussion. One of these addresses corresponds to the Internet gateway 11. Hence, when work-station 16 wishes to direct a message to the Internet, work-station 16 first encapsulates the message in an IP message specifying its IP address and the IP address associated with the internet gateway. This message is then further encapsulated in an Ethernet message from adapter 17 to adapter 14.

When the unpacked IP message reaches server 12, server 12 determines the correct routing for the message based on the destination IP address. In general, server 12 maintains information, typically in the form of a mask, that allows it to determine if an IP address is part of the local area network or corresponds to a computer that must be reached via the Internet. If the IP address is not local, server 12 sends the message via the Internet gateway.

The bindings between the IP address and the Ethernet addresses are not, in general, saved when a computer system is shut down. These bindings are re-established the first time a computer wishes to send a message to an IP address after that computer boots up. This method of operation simplifies the installation of new hardware by removing the need to inform all computers on the network when new Ethernet adapters are connected or old ones removed.

When a computer first attempts to contact another computer, it determines the Ethernet address that corresponds to the target IP address by sending an address resolution protocol (ARP) message containing its IP address, its Ethernet address, and the target IP address. All Ethernet adapters on the network unpack this message and pass on the message to the Ethernet drivers which compare the IP addresses associated with their Ethernet adapters to the target IP address. If an IP address matches, a return packet is sent to the sender giving the Ethernet address associated with the target IP address.

Consider the case in which work-station 16 boots up and wishes to determine the address of the Ethernet adapter associated with gateway 11. Computer 16 has the IP address of the gateway stored in its network configuration data. To find the corresponding Ethernet address, work-station 16 broadcasts an ARP message on network 20. This message contains the IP address of work-station 16, the Ethernet address of work-station 16, and the IP address whose Ethernet address is being sought, i.e., the IP address associated with gateway 11. Each network adapter reads this message and the interface software compares the target IP address with that associated with the computer connected to the network card. If the IP addresses match, a reply message giving the Ethernet address of the network card is sent back to the requesting computer.

Now consider the case in which computer 16 is moved from its original local area network to a hotel local area network which does not include the present invention. When computer 16 attempts to determine the Ethernet address corresponding to the IP address programmed into it for the Internet gateway, an error will occur. This error results from the fact that the IP addresses on the hotel network are unique to that network; hence, no computer on the hotel local area network will respond to the address resolution protocol message. As noted above, one solution to this problem is to provide the mobile computer with a new IP address to use for connecting to the Internet, i.e., the IP address used for such purposes on the hotel's local area network. This solution, however, requires reprogramming of the user's computer.

The present invention avoids this reprogramming by utilizing a combination of a translation table and server software that handles invalid IP addresses. The server software of the present invention responds to all ARPs addressed to IP addresses that are not local to the hotel network. This foreign class of IP address would generate errors in conventional networks. When server 12 detects such an ARP it returns its Ethernet address to the sender and makes an entry in translation table 31, if needed. The entry associates a valid IP address on the hotel network with the IP address of the originating computer, i.e., the IP address used by the mobile computer on its home network.

Server 12 also processes all messages having foreign IP destinations, i.e., destinations that are not local to the hotel local area network. Such messages will always be routed to server 12, since server 12 will have provided its Ethernet address in response to an ARP sent previously by the sender when the sender set up the bindings between the target IP address and an Ethernet address as described above.

To simplify the following discussion, denote the IP address of the mobile user, as stored on her computer, as the "home IP address". This is the address associated with her computer on her local area network at her headquarters. Denote the new address associated with her home IP address in the translation table as the "hotel IP address". This is an IP address that is local to the hotel network. Finally, denote the IP address contained in a message of the computer to which a message is to be sent as the "destination IP address" and the IP address of the computer sending the message as the "source IP address". As noted above, when the server of the present invention detects an ARP for a foreign IP address on the local area network of the hotel, the server makes an entry in the translation table for the home IP address contained in the ARP and assigns a corresponding hotel IP address to be used in place of that home IP address.

Basically, a server according to the present invention processes a message directed to a non-local IP address by translating the source IP address from the home IP address to the hotel IP address and then sending the message on the Internet. When the server receives a message from the Internet for a hotel IP address, the server replaces the destination address with the corresponding home IP address and places the message on the local area network at the hotel. This protocol is sufficient to assure that messages are properly delivered without changing the IP address of the user's computer.

The maimer in which messages reach their correct destination can be viewed in terms of two types of messages that are to be sent from the mobile computer that is now connected to the hotel network. First, consider the case in which the mobile computer wishes to send a message to a server that would normally be reached from the user's headquarters' local area network via the Internet. This message will have a source IP address equal to the home IP address and a destination address that is not within the addresses on the hotel local area network. Since the destination address is not local, the server at the hotel will pick up the message and assume that it is to be sent on the Internet via the Internet gateway. Before routing the message to the Internet gateway, the server changes the source IP address from the home IP address of the mobile computer to the hotel IP address. The computer on the Internet with the destination IP address eventually receives the message. Any response is sent back on the Internet to the source address contained in the message, i.e., the hotel IP address. Upon receiving the message, the hotel server translates the destination address to the home IP address and places the message on the local area network where it is picked up by the mobile user's computer which recognizes its home IP address.

Next, consider the case in which the mobile user sends a message to a workstation that would be on her local area network at headquarters. Once again, the user's computer will send an address resolution packet to determine the Ethernet address of the appropriate adapter card the first time the user attempts to send a message to the target workstation. Hence, there will be an entry in the translation table for the user's home IP address and the user's machine will direct messages to the hotel server's ethernet adapter. Server 12 picks up the message since the destination address is not local to the hotel local area network. The server translates the origin IP address from the home IP address of the user to the hotel IP address associated with it and sends the message via the Internet. The message arrives at the server on the headquarters local area network, since that server receives all messages from the Internet for IP address that are local to that network. Hence, the message will be properly delivered to the workstation on the headquarters workstation, although the origin IP address will be different from the origin IP address that would have been in the message had the user been connected to the headquarters network when the message was sent. A return message will likewise be properly handled since the origin address in the message correctly identifies the hotel server. Once the return message reaches the hotel server, the destination address will be translated back to the home IP address of the user and the message sent to the user on the hotel local area network.

It should be noted that the translation process utilized by server 12 must also correct the check sums in the message to account for the new IP addresses that are part of the message. In addition, it should be noted that certain older message types, specifically File Transfer Protocol (FTP) protocol messages, include ASCII versions of the IP addresses embedded within the actual message. Hence, the preferred embodiment of the present invention tests for such messages, unpacks the entire message, and also translates the internal copies of the IP addresses.

As noted above, providing a local area network for all guests poses certain security problems. Once a guest computer is logged onto the network and assigned appropriate addresses, that computer, in principle, can access other guest computers through the network neighborhood commands of the operating system. If a guest has a computer that has been configured for file sharing, the enabled files and/or drives may be accessible to other guests.

To prevent such security problems, the present invention utilizes a filter that blocks all broadcast messages that are not directed to the server. Since a user must use such a broadcast message to determine the relevant information for the other computers on the hotel's network, this filter effectively prevents one user from gaining access to another user's computer. The filter is included in the switches used to connect the various computers on network 20, and hence, this filter is also transparent to the users of the hotel network.

It should also be noted that the mobile computer user may also have an IP address stored for a DNS server that makes the translation from an ASCII address such as "compuserve-.com" to the corresponding IP address on the Internet. Many local area networks utilize local servers for this process, and hence, the IP addresses will also be invalid on the hotel's network. These messages are easily detected since they are directed to a specific"port" on the invalid IP address. In the preferred embodiment of the present invention, the server treats all DNS messages as being directed to an invalid IP address and substitutes a valid DNS address associated with the local server.

In the preferred embodiment of the present invention, entries in the translation table maintained by the server are removed in response to any of a number of conditions. For example, when the user checks out of her hotel room, the translation table entries corresponding to that room are removed. Since the hotel will, in general, have fewer IP addresses than rooms, it is also advantageous to purge the translation table of entries that are not currently being used to free IP addresses. Such purges can be triggered by the time that has lapsed since the entry was last used. Alternatively, the table can be purged at a predetermined time, typically during the hours in which no one would be actively using the network.

The present invention has been described in terms of a hotel local area network. However, it will be obvious to those skilled in the art from the preceding discussion that the teachings of the present invention can be applied to other remote local area networks to provide access for visiting computer users.

Various modifications to the present invention will become apparent to those skilled in the art from the foregoing description and accompanying drawings. Accordingly, the present invention is to be limited solely by the scope of the following claims.

What is claimed is:

1. A method for operating a local area network having a server and a plurality of computers including a first computer, said server including an Internet gateway, each computer in said local area network having a unique IP (Internet protocol) address and a unique network adapter address associated with that computer, each computer determining the network adapter address associated with a target IP address by broadcasting an address resolution packet (ARP) on said local area network, said ARP including at least said target IP address and said network adapter address and IP address of said computer broadcasting said ARP, said computer having said target IP address responding by sending a response message that includes said network adapter address of said computer having said target IP address, at least said first computer being connectable to a home network different from said local area network, said method comprising the steps of:

using a first IP address by said first computer when said first computer communicates using said home network;

storing information identifying IP addresses in a foreign class corresponding to computers not configured for connection to said local area network including storing said first IP address of said first computer;

sending a first communication from said first computer to said server;

causing said server to send a response to each ARP having a target IP address in said foreign class, said server returning said network adapter address of said server in said response message and assigning an IP address associated with said local area network to said IP address of said computer sending said ARP in said response including assigning by said server after receiving said first communication from said first computer a second IP address associated with said local area network to said first computer that is different from said first IP address of said first computer, said second IP address being assigned independently of program code provided with said first computer to obtain said second IP address;

causing said server to translate each outbound message originating on said local area network for a destination address in said foreign class from an originating address for which one of said address' associated with said local area network has been assigned, including a first outbound message, different from said first communication, sent to said server by said first computer using said first IP address, by replacing said first IP address of said computer originating said message with said corresponding second IP address assigned to that computer, said first computer operating at all times independently of said second IP address when said first computer is connected to said local area network including when said first computer sends first outbound message to said server; and sending said translated outbound messages via said gateway including using said second IP address to send said first outbound message from said server via said gateway.

2. The method of claim 1 further comprising the steps of:

examining each inbound message received on said gateway for a destination IP address associated with said local area network to determine if one of said foreign IP addresses has been assigned to said destination address, and replacing said destination IP address in said inbound message with said foreign IP address if such an assignment has been made including replacing said second IP address with said first IP address when said inbound message is for said first computer; and sending said inbound message on said local area network.

3. The method of claim 1 further comprising the step of restricting broadcast messages on said network such that a broadcast transmitted by said server will be directed to all other computers on said network, but a broadcast transmitted by said first computer on said local area network will be directed only to said server.

4. The method of claim 1 further comprising the step of detecting messages on said local area network directed to a predetermined port on a computer in said foreign class and replacing said destination address in such messages with a predetermined IP address including detecting an inbound message for said first computer and replacing said second IP address in said message with said first IP address of said first computer.

5. The method of claim 1 wherein said step of translating said outbound messages further comprises the step of unpacking all messages of a predetermined message type and replacing any internal copies of said IP address in said foreign class with said assigned IP address.

6. A method, as claimed in claim 1, wherein:

said storing step includes storing said second IP address.

7. A method for communicating using a global computer network, comprising:

establishing a first address associated with a computer that can be connected to a first network having a first server wherein, when said computer communicates to the global computer network using said first network, said computer uses said first address;

connecting said computer to a second network having a second server in which said first address is recognized by said second server as being different from computers that are part of said second network, said step of connecting including sending a first communication from said computer to said second server and associating a global computer network address to said computer by said second server independently of program code provided with said computer to obtain said global computer network address; and providing a second communication, different from said first communication, between said computer and the global computer network, said providing step including providing said second communication from said computer to said second server using a second network address and providing said second communication to the global computer network by said second server using said global computer network address, said computer operating at all times independently of said global computer network address when said computer is connected to said second network and said second communication is provided independently of said computer using said global computer network address.

8. A method, as claimed in claim 7, wherein:

said sending step includes recognizing by said second server that said computer is not part of said second network.

9. A method, as claimed in claim 8, wherein:

said associating step including storing in memory a correlation between said first address and said global computer network address after said sending step.

10. A method, as claimed in claim 9, further including:

removing from said memory said correlation between said first address and said second address after a predetermined event, wherein said predetermined event is defined by a group that includes a predetermined time.

11. A method, as claimed in claim 7, wherein:

said first communication includes an address resolution packet sent to said second server with said first address by said computer and said associating step includes processing said address resolution packet by said second server.

12. A method, as claimed in claim 11, wherein:

said associating step includes responding by said second server to said computer by including a network adapter address of said second server.

13. A method, as claimed in claim 7, wherein:

said second communication includes a message and said providing step includes transmitting said message from said second server to said global computer network.

14. A method, as claimed in claim 7, wherein:

said second communication includes a message and said providing step includes receiving said message including said second network address by said second server.

15. A method, as claimed in claim 14, wherein:

said associating step includes translating said second network address to said second address by said second server and sending said message to said computer using said second address.

16. A method, as claimed in claim 7, further including:

preventing access by said computer to substantially any other computer on said second network.

17. A method, as claimed in claim 7, wherein:

said first network address includes at least one of: being the same as said second network address and being different from said second network address and in which said global computer network address is different from said second network address.

18. An apparatus for communicating using a global computer network in which a computer has two different addresses, comprising:

a computer having a first address associated with a first network wherein, when communicating to the global computer network using a first server on said first network, said computer uses said first address; and a second network to which said computer is connected, said second network including a second server, said second server associating a global computer network address with said computer independently of program code provided with said computer to obtain said global computer network address;

wherein said computer, when sending each communication to the global computer network using said second server, sends said communication to said second server using a second network address, and said second server changes said second network address to said global computer network address in order to send each said communication to the global computer network, said computer operating at all times independently of said global computer network address when connected to said second server including when each said communication is sent to the global computer network.

19. An apparatus, as claimed in claim 18, wherein:

said computer sends an address resolution packet to said second server and said second server responds with its network adapter address.

20. An apparatus, as claimed in claim 18, wherein:

said second server includes memory for storing information related to a correlation between said second network address and said global computer network address.

21. An apparatus, as claimed in claim 18, wherein:

said first address is the same as said second network address and said second network address is different from said global computer network address.

22. An apparatus, as claimed in claim 18, wherein:

said second server is used in preventing access to substantially any other computer on said second network by said computer.

23. An apparatus, as claimed in claim 18, wherein:

said second server is used in determining whether a predetermined event has occurred for removing information from a memory of said second server related to a correlation between said second network address and said global network address.

24. An apparatus, as claimed in claim 23, wherein:

said predetermined event includes a predetermined time including at least one of a predetermined time interval related to time elapsed since said second address was utilized and a defined time during each day about which said information related to said correlation is removed.

* * * * *